(No Model.) 3 Sheets—Sheet 1.

A. H. AUSTIN.
CHECK REGISTER.

No. 256,534. Patented Apr. 18, 1882.

Inventor
A. H. Austin
per L. W. Serrell
atty (No Model.) 3 Sheets—Sheet 2.
A. H. AUSTIN.
CHECK REGISTER.
No. 256,534. Patented Apr. 18, 1882.
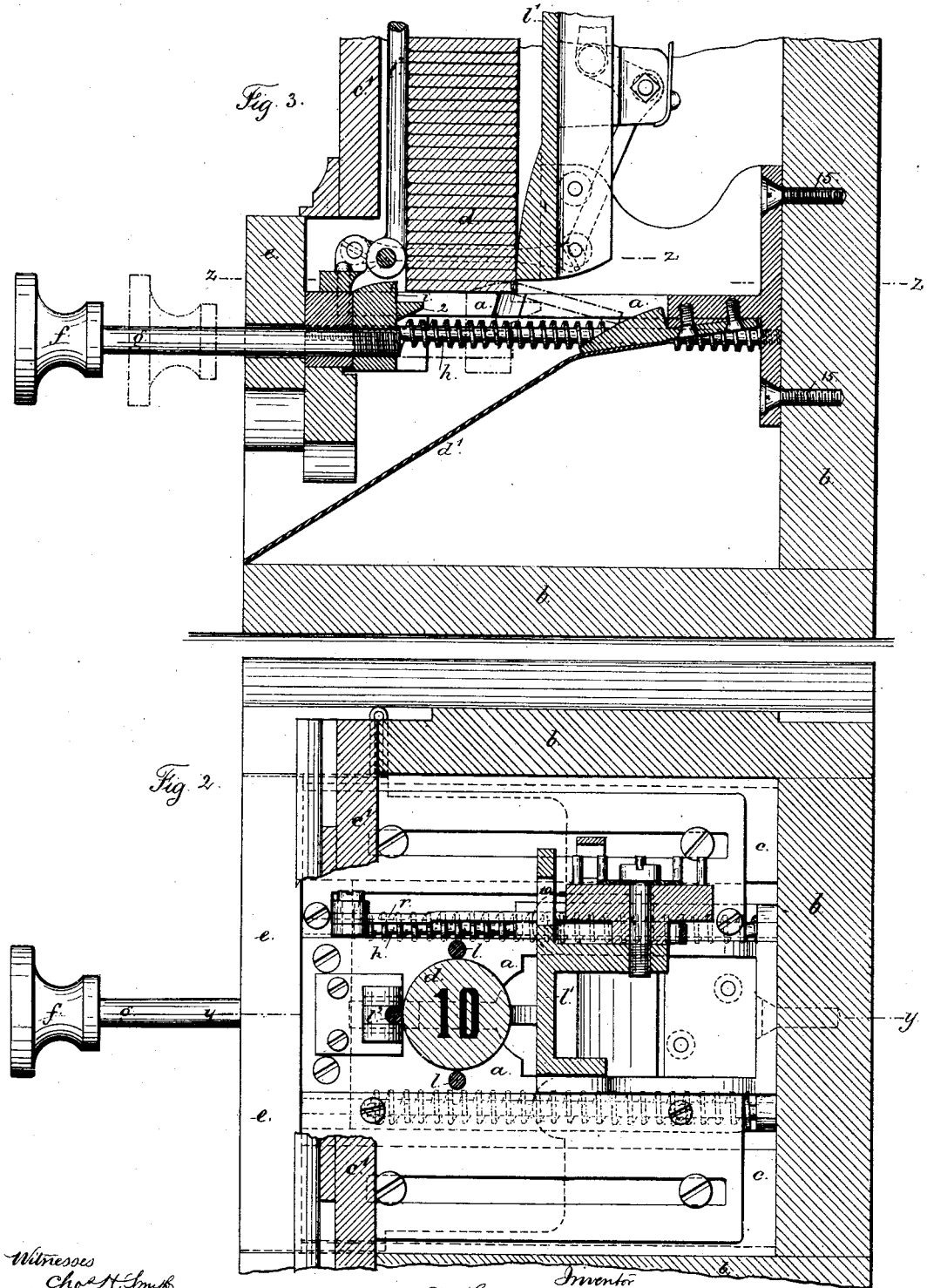

(No Model.) 3 Sheets—Sheet 3.

A. H. AUSTIN.
CHECK REGISTER.

No. 256,534. Patented Apr. 18, 1882.

Witnesses
Chas. H. Smith
J. Haib

Inventor
A. H. Austin
per Lemuel W. Serrell
atty

UNITED STATES PATENT OFFICE.

ADRIAN H. AUSTIN, OF NEW YORK, N. Y., ASSIGNOR TO HIMSELF, JOSEPH F. TOBIN, AND JOSEPH G. GRIFFITH, OF SAME PLACE.

CHECK-REGISTER.

SPECIFICATION forming part of Letters Patent No. 256,534, dated April 18, 1882.

Application filed November 21, 1881. (No model.)

*To all whom it may concern:*

Be it known that I, ADRIAN H. AUSTIN, of the city and State of New York, have invented an Improvement in Check-Registers, of which the following is a specification.

Registers have been made in which metallic checks have been threaded upon a rod and the bottom check has been removed by the action of a pusher. These devices are intended for use in restaurants and other places of business where the customer is handed a check representing the amount that has to be paid to the cashier. In these registers there is a risk that two checks may be thrown out at the same time, and hence the accuracy of the count or tally will be lost. Under other circumstances a check can be introduced from the bottom without altering the tally, and in this manner the accuracy of the instrument is destroyed.

My invention is for rendering the register more accurate and reliable than those heretofore made; and said invention consists in the combination of devices hereinafter more fully set forth.

Figure 1:
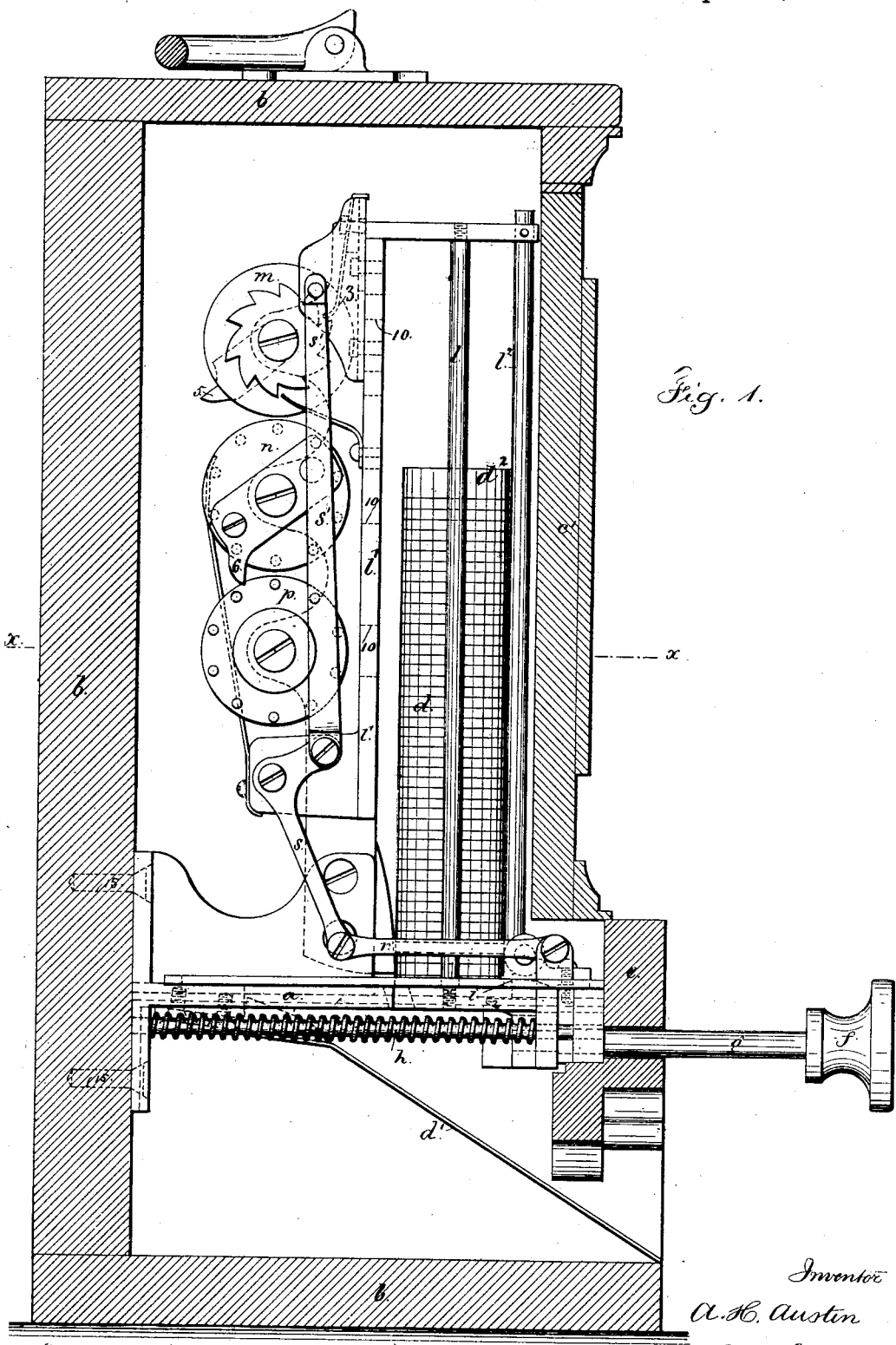
Figure 4:
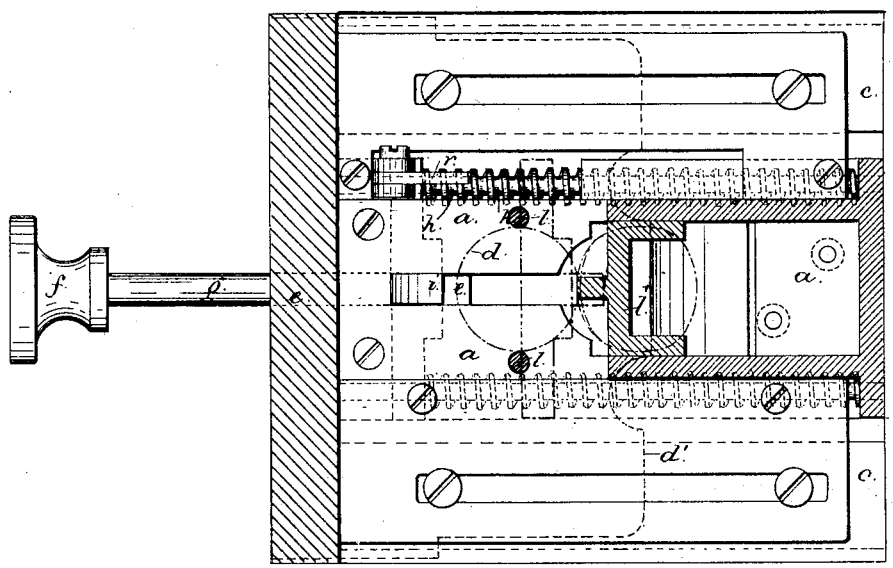

In the drawings, Figure 1 is an elevation of the apparatus, the case being in section. Fig. 2 is a plan view below the line $x\ x$. Fig. 3 is a vertical partial section at the line $y\ y$, and Fig. 4 is a partial plan of the bed below the line $z\ z$.

The instrument herein described is to be one of a number. Each instrument may have a separate case, as represented in the drawings, or a number of instruments may be placed in one case. It is to be understood that one instrument is to receive checks marked 10, another checks marked 20, another 30, and so on, each check designating either the amount that is to be paid or the check-number that is to be given to the customer. As the marks and numbers on the checks are arbitrary and may be of any desired character, and as the number of registers used may vary and one or more registers may be placed in one case, it is only necessary herein to describe one of the register-instruments and the mode of using the same, leaving the maker to determine the character of the check and the number of instruments placed together.

I make use of a bed, $a$, that may be supported removably in the case $b$ upon slides $c$.

The case may have a door at $c'$ to give access to the mechanism and for the insertion of the numbered checks $d$ and for examining the counting-wheels. This door $c'$ should be provided with a reliable lock, so that the same cannot be opened by an unauthorized person.

The bed $a$ is provided with a front piece, $e$, which is permanently attached to the same; and this bed $a$ and front piece, $e$, are immediately below the door $c'$, and may be held in place when the door is closed; but when the door is open the bed and front can be drawn forward and taken out of the case, if required. I, however, have shown screws at 15 for holding the register into the case.

Below the bed $a$, and behind the front $e$, there is an inclined delivery-plate, $d'$, down which the check slides after it has been separated from the pile of checks, and there is an opening between the lower edge of the front $e$ and said plate $d'$, for the check to be passed through.

The push-button $f$ is upon the slide-rod $g$ that passes through the front $e$, and upon this push-button should be marks or numbers corresponding to the marks or numbers upon the checks, so that the party desiring a particular check will push the button of the range of buttons having the mark corresponding to the desired check.

There is a cross-piece at the inner end of the rod $g$, and this is guided by the rods $h$, around which are helical springs that are compressed when the button is pushed in, and said springs will throw the rod and push the button forward again when pressure on the button is relieved.

The bed $a$ is slotted in line with the rod $g$, and there is a separator, $i$, upon the cross-piece of the rod $g$, projecting up through the slot in the bed $a$, and rising above the surface thereof a distance that is slightly less than the thickness of the check.

The checks $d$ stand in a pile upon the bed $a$, and they are held in place by the vertical wires or rods $l$ at the sides of the pile, and there is a backing-plate, $l'$, behind the pile, and a movable rod, $l^2$, in front, that can be lifted or swung out of the way when checks are inserted to replenish the pile.

At the bottom of the plate $l'$ there is a space, between it and the bed $a$, (see Fig. 3,) corresponding to the thickness of the check, so that the bottom check can be separated from the pile pushed back below the end of the plate $l'$ by the separator $i$ when the pusher is operated.

The bed $a$ is removed beneath the plate $l'$, so that when the pusher arrives at the limit of its backward movement the back edge of the check rests upon the incline $d'$, and the check drops below the surface of the bed $a$, and it is received upon the finger 2, the upper surface of which is below the surface of the bed $a$. Hence the check cannot fall away until the pressure upon the push-button is relieved and the finger 2 moves back from beneath the front edge of the check. During the backward movement of the pusher the separator $i$ holds up the pile of checks, and they drop upon the bed as the said separator passes out from beneath them. By this construction the backward and forward movements are necessary before a check can be delivered. Hence there is no risk of two checks being thrown out at the same time, and it is not possible to introduce a check from below, because the finger 2, the separator $i$, and the edge of the bed $a$ all intervene between the incline $d'$ and pile of checks, and the finger 2 prevents the introduction from below of any false check, while the pile of checks is held up by the separator $i$.

The number of checks in the pile can be counted and properly charged when placed in the check-holder, so that in settling accounts there is a record that can be used to complete the amount of money received by the cashier. I, however, prefer to employ in addition a counting mechanism to determine how many times the pusher is operated.

The counting-wheels $m$, $n$, and $p$ are made to revolve on fixed gudgeons or studs, and the edges of these wheels are marked with numbers to denote the number of times the pusher $f$ is operated, in units, tens, hundreds, and thousands, and the edges of these counting-wheels should also be marked with dollars and cents corresponding to the value represented by the checks that are removed, so as to render it unnecessary to compute the value of the checks taken off.

The units counting-wheel $m$ is operated by a link, $r$, lever $s$, links $s'$, and pawl 3, acting upon the ratchet-wheel upon the counting-wheel $m$, said ratchet-wheel having ten teeth.

The counting-disk $n$ is turned one tooth every rotation of the disk $m$ by the projecting pawl or finger 5. This disk $n$ therefore indicates tens up to one hundred. The disk $p$ is moved in like manner by the disk $n$ and finger 6, and indicates hundreds up to one thousand.

The number of disks may be increased to any desired extent. In the plate $l'$ there are openings, as at 10, opposite the center of each disk, so that the figures on such disks can be read off.

The upper or false check, $d^2$, is considerably thicker than the other checks, and it cannot be pushed beneath the plate $l'$. Hence the register cannot be operated to produce a false record after the supply of checks is exhausted.

I am aware that the check has been drawn forward by the action of a separator and delivered upon an incline down which it slips into the person's hand. In my improvement the check is pushed back and held by the finger after it drops from the pile until the pusher and finger move forward again, so that the check slides down the incline and is delivered. Hence there is no opportunity to remove more than one check at a time, or to replace checks from below.

I claim as my invention—

1. The combination, in a check-register, of the pusher-button $f$, rod $g$, separator $i$, finger 2, upon the separator below the surface of the bed, the plate $l'$, behind the pile of checks, the bed $a$, with an opening for the check to pass through, and the stationary incline $d'$, as and for the purposes set forth.

2. The combination, in a check-register, of a bed, $a$, supporting a pile of checks, a pusher to carry off the lowest check in the pile, a finger to support one edge of the check that drops below the surface of the bed, the plate $l'$, behind the pile of checks, and a stationary incline, $d'$, a case to contain the register, supports for the plate $a$, upon which the register can be slid out, and an inclosing-door for the said case, substantially as set forth.

3. The combination, with the bed $a$, pusher $g$, separator $i$, finger 2, and plate $l'$, of the links $r$ and $s'$, lever $s$, ratchets, pawls, and counting-wheels $m$, $n$, and $p$, behind the openings in the plate $l'$, substantially as set forth.

Signed by me this 15th day of November, A. D. 1881.

ADRIAN H. AUSTIN.

Witnesses:
GEO. T. PINCKNEY,
CHAS. H. SMITH.